UNITED STATES PATENT OFFICE.

MAX ALFRED QUEISSER, OF HAMBURG, GERMANY, ASSIGNOR TO THE FIRM OF PEARSON & CO. GESELLSCHAFT MIT BESCHRÄNKTER HAFTUNG, OF HAMBURG, GERMANY.

STABLE COMPOSITION CONTAINING HYDROGEN PEROXID.

959,605.   Specification of Letters Patent.   Patented May 31, 1910.

No Drawing.   Application filed August 5, 1908.   Serial No. 447,124.   (Specimens.)

*To all whom it may concern:*

Be it known that I, MAX ALFRED QUEISSER, a subject of the German Emperor, and resident of Hamburg, Germany, have invented a certain new and useful Stable Composition Containing Hydrogen Peroxid, of which the following is a specification.

The property of hydrogen peroxid of decomposing in contact with other substances is well known. In consequence of this property it has not heretofore been possible to use hydrogen peroxid as an addition to medicaments, ethereal oils and the like in stable form.

This invention relates to a method of using hydrogen peroxid in stable form as an addition to other substances, medicaments and the like. For this purpose the hydrogen peroxid is mixed with materials which have no decomposing effect on the same and which absorb it in such manner that the hydrogen peroxid remains absorbed and does not decompose. It has already been proposed to use gelatin as a carrier of the hydrogen peroxid in admixture with various medicaments, &c. The result however was unsuccessful because the hydrogen peroxid is decomposed in the gelatin mass itself, which is shown by the production of bubbles resulting from the liberated oxygen. A high percentage of hydrogen peroxid stirred in gelatin produces a lasting liquefaction of the hydrogen peroxid as well as the appearance of decomposition. This appears in about eight to fourteen days so that no such preparation can be regarded as durable. Better results are given by solutions of sugar and albumen, which however are not applicable for all medicaments, &c.

Good carriers for keeping hydrogen peroxid have proved to be vegetable substances such as tragacanth, agar-agar, gum arabic and the like. These substances are used in the form of mucilage by soaking or steeping them in a solution of hydrogen peroxid, whereby the liquid is stored up in the mass without being decomposed. It has now been discovered that burnt gypsum used along with vegetable mucilage is a vehicle for hydrogen peroxid since the water in which the latter is dissolved combines with the burnt gypsum as water of crystallization and the mass so formed holds mechanically large quantities of the peroxid, a reaction between the gypsum and the hydrogen peroxid being prevented and the stableness of the hydrogen peroxid at the same time still increased. Such an addition of gypsum is very useful for example in tooth paste, since the gypsum cleans the teeth and the hydrogen peroxid coming in contact with the saliva and decomposing liberates nascent oxygen which has a bleaching action on the teeth.

The following examples serve as a further elucidation of the invention.

1. *Skin cream.*—Tragacanth 3.0 g., agar-agar 3.0 g., hydrogen peroxid 100.0 g., oil of roses 3 drops.

2. *Tooth paste.*—Tragacanth 3.0 g., agar-agar 3.0 g., hydrogen peroxid 100.0 g., burnt gypsum 100.0 g., oil of peppermint 10 drops.

The ingredients of the composition are mixed or compounded by grinding or triturating the mixtures in a mortar or by passing the same repeatedly through a mill or the like. The hydrogen peroxid is the customary solution containing not over 30% of hydrogen peroxid.

I claim:

1. The method of making toilet preparations, which comprises mixing a vegetable mucilaginous substance with peroxid of hydrogen, adding thereto a substance adapted to chemically combine the water containing the peroxid, as water of crystallization, the hydrogen peroxid in excess being mechanically held by the mixture.

2. The method of making toilet preparations, which comprises mixing a vegetable mucilaginous substance with peroxid of hydrogen, adding thereto burnt gypsum, whereby the water containing the peroxid combines with the gypsum, the hydrogen peroxid in excess being mechanically held by the mass so formed.

3. A composition of matter consisting of a mixture of a mucilaginous substance with a crystalline abrasive containing water of crystallization, and hydrogen peroxid mechanically held in the mixture.

4. A composition of matter consisting of a mucilaginous substance, gypsum, and hydrogen peroxid mechanically held in the mixture.

Signed at Hamburg this 25th day of July 1908.

MAX ALFRED QUEISSER.

Witnesses:
MAX A. G. LEMCKE,
ERNEST H. L. MUMMENHOFF.